United States Patent Office 3,084,995
Patented Apr. 9, 1963

3,084,995
PROCESS FOR STORAGE OF CHLORINE DIOXIDE
Heribert Grubitsch, Graz, Austria, assignor to FMC Corporation, a corporation of Delaware
No Drawing. Filed Dec. 16, 1960, Ser. No. 76,148
1 Claim. (Cl. 23—152)

The invention relates to a process for storage of chlorine dioxide, and an apparatus useful in practice of this process.

Chlorine dioxide is used for bleaching, sterilizing, deodorizing, and in combatting pests, and in comparison with chlorine has a number of substantial advantages. However, chlorine dioxide is a very dangerous explosive substance in the liquid state and in higher gas concentrations. The explosion danger ceases as soon as the partial pressure of the chlorine dioxide in the gaseous state is below about 70 Torricelli, otherwise referred to as millimeters of mercury.

Spontaneous decomposition of chlorine dioxide is promoted in the presence of impurities such as chlorine oxide, bromine, organic substances, and the like which often contaminate the gas in production. As a result of the indicated difficulties, chlorine dioxide often is prepared in situ at the situ of use, and is immediately used. Since the costs of gas generating units useful for this purpose are considerable, and require trained personnel, the application of chlorine dioxide has been considerably limited. Accordingly, there has existed a need for a means of making chlorine dioxide available readily and safely in stored form.

Solutions of chlorine dioxide in water and in carbon tetrachloride have been proposed for this purpose. They have not proved successful, however, because of the slight solubility of chlorine dioxide in these diluent solvents, and because of the spontaneous decomposition of the chlorine dioxide.

A process for the preparation of a stable solution of chlorine dioxide also exists, which is based on the solubility of chlorine dioxide in liquid chlorine. However, the presence of elementary chlorine is not desired for many purposes because of its higher oxidation potential as well as the acid reaction of its hydrolysis products.

In accordance with the present invention, it has been found that chlorine dioxide may be stored safely together with carbon dioxide in liquid state in steel cylinders at high pressures. For stabilization of chlorine dioxide with carbon dioxide, it must first be purified according to the procedure of Luther and Hofmann (Zeitschrift Phys. Chem. Bodenstein Festb. 1931, 755). The mixture of chlorine dioxide, carbon dioxide and air is condensed at suitable temperatures without excess pressure. A homogeneous liquid phase, which does not produce any azeotropic mixture, is thereby formed in all mixture ratios of chlorine dioxide and carbon dioxide at room temperature under the pressure set thereby. On boiling off of the liquid phase, both the composition of the vapor and also that of the liquid phase is changed to form higher chlorine dioxide concentrations.

Chlorine dioxide-carbon dioxide mixtures can be stored safely in pressure cylinders, with the mixtures containing up to about 25 weight percent of chlorine dioxide. If the iron or steel cylinders are coated inside with fused silver chloride, no spontaneous decomposition of the chlorine dioxide takes place up to 50° C. At an initial concentration of 27 mol percent of chlorine dioxide, at 35 atmospheres gauge pressure at 15° C., a gas first boils off containing 2 volume percent of chlorine dioxide; the pressure in the steel cylinder is thereby reduced. With further gas outflow, as soon as the pressure has reached 20 atmospheres gauge pressure, the chlorine dioxide content of the escaping gases is 7%; it is 16% at 10 atmospheres gauge pressure, and it goes up to 36% by volume of chlorine dioxide at 5 atmospheres gauge pressure, whereby the composition of the liquid phase is also displaced to higher chlorine dioxide concentrations. Extremely pure chlorine dioxide finally boils off, which is far less expensive than the gas prepared and purified according to the usual process.

As a result of this concentration of chlorine dioxide in the gas phase, no gas need be removed from the steel cylinder. On the other hand, if the condensed liquid is caused to flow out by inverting the cylinder with the valve below, no higher concentration can be formed in the gas phase than corresponds to the original composition and the chlorine dioxide concentration of the escaping liquid remains almost constant.

If the liquid chlorine dioxide-carbon dioxide mixture is sprayed into an air current, the desired chlorine dioxide concentrations can be safely set.

What is claimed is:

Stable solution of purified chlorine dioxide in liquid carbon dioxide, in which the chlorine dioxide content of the solution at normal temperature is no greater than about 25 weight percent.

References Cited in the file of this patent

UNITED STATES PATENTS

| | | |
|---|---|---|
| 2,394,064 | Hutchinson | Feb. 5, 1946 |
| 2,542,762 | Forbes et al. | Feb. 20, 1951 |
| 2,678,922 | Stone | May 18, 1954 |
| 2,683,651 | Williamson et al. | July 13, 1954 |
| 2,758,016 | Williamson et al. | Aug. 7, 1956 |

OTHER REFERENCES

"Chemical Abstracts," vol. 39, No. 1, page 270, Oct. 10, 1945.

Mellor: "Comprehensive Treatise on Inorganic and Theoretical Chemistry," vol. 3, page 401 (1923), Longmans, Green & Co., New York.